United States Patent
Torigoe et al.

(10) Patent No.: US 7,859,100 B2
(45) Date of Patent: Dec. 28, 2010

(54) THERMAL BARRIER COATING MATERIAL, THERMAL BARRIER MEMBER, AND MEMBER COATED WITH THERMAL BARRIER AND METHOD FOR MANUFACTURING THE SAME

(75) Inventors: Taiji Torigoe, Takasago (JP); Ikuo Okada, Takasago (JP); Katsumi Namba, Takasago (JP); Kazutaka Mori, Takasago (JP); Wei Pan, Haidan district (CN); Qiang Xu, Haidan district (CN)

(73) Assignees: Mitsubishi Heavy Industries, Ltd., Tokyo (JP); Tsinghua University, Beijing (CN)

( * ) Notice: Subject to any disclaimer, the term of this patent is extended or adjusted under 35 U.S.C. 154(b) by 185 days.

(21) Appl. No.: 11/301,339

(22) Filed: Dec. 13, 2005

(65) Prior Publication Data

US 2006/0151856 A1    Jul. 13, 2006

(30) Foreign Application Priority Data

Dec. 14, 2004    (JP) .............................. 2004-361026

(51) Int. Cl.
*H01L 23/06*    (2006.01)
(52) U.S. Cl. .................. 257/703; 257/632; 257/641; 257/E23.002
(58) Field of Classification Search .............. 257/632, 257/641, 703
See application file for complete search history.

(56) References Cited

U.S. PATENT DOCUMENTS

| 6,117,560 | A  | 9/2000 | Maloney |
| 6,177,200 | B1 | 1/2001 | Maloney |
| 6,258,467 | B1 | 7/2001 | Subramanian |

(Continued)

FOREIGN PATENT DOCUMENTS

EP    1 309 738 A    5/2003

(Continued)

OTHER PUBLICATIONS

European Search Report dated Feb. 28, 2006 issued in corresponding European Patent Application No. 05112027.7-2315.

(Continued)

*Primary Examiner*—Wai-Sing Louie
(74) *Attorney, Agent, or Firm*—Westerman, Hattori, Daniels & Adrian, LLP

(57) ABSTRACT

Provided are a thermal barrier coating material and a member coated with thermal barrier that can suppress the separation when used at a high temperature, and have a high thermal barrier effect; a method for manufacturing the member coated with thermal barrier; a turbine member coated with the thermal barrier coating material; and a gas turbine. More specifically provided are a shield coating member comprising a heat-resistant substrate, a bond coat layer formed on the heat-resistant substrate, and a ceramic layer formed on the bond coat layer, wherein the ceramic layer comprises a ceramic represented by a general formula $A_2Zr_2O_7$, wherein A denotes a rare earth element, and the ceramic layer has (a) a porosity of 1 to 30%, (b) cracks in a thickness direction in pitches of 5 to 100% the total thickness of layers other than the bond coat layer on the heat-resistant substrate, or (c) columnar crystals.

6 Claims, 6 Drawing Sheets

U.S. PATENT DOCUMENTS

| | | |
|---|---|---|
| 7,655,326 B2 | 2/2010 | Torigoe et al. |
| 2002/0028344 A1 | 3/2002 | Beele |
| 2002/0061416 A1* | 5/2002 | Subramanian .............. 428/633 |
| 2004/0001977 A1 | 1/2004 | Subramanian |
| 2004/0058200 A1 | 3/2004 | Chaput et al. |
| 2004/0101699 A1 | 5/2004 | Vassen et al. |

FOREIGN PATENT DOCUMENTS

| | | |
|---|---|---|
| EP | 1 400 611 A | 3/2004 |
| EP | 1 550 642 A | 7/2005 |
| EP | 1 657 536 A1 | 5/2006 |
| JP | 10-212108 | 8/1998 |
| JP | 2000-119870 A | 4/2000 |
| JP | 2000-144365 A | 5/2000 |
| JP | 2001-505620 A | 4/2001 |
| JP | 2002-069607 A | 3/2002 |
| JP | 2003-160852 | 6/2003 |
| JP | 2003-160852 A | 6/2003 |
| JP | 2003-277952 | 10/2003 |

OTHER PUBLICATIONS

A. A. Kulkarni et al. "Porosity-Thermal Conductivity Relationships in Plasma Sprayed Zirconia Coatings" 2000, pp. 1061-1066, ASM International, USA, XP002379465.

Extended European Search Report dated Jun. 16, 2006, issued in corresponding European Application No. 05112027.7.

Extended European Search Report dated Sep. 22, 2008, issued in corresponding European patent application No. 07 12 0758.

Japanese Office Action mailed on Aug. 3, 2010, issued in corresponding Japanese Patent Application No. 2005-360801.

* cited by examiner

THERMAL BARRIER COATING MATERIAL, THERMAL BARRIER MEMBER, AND MEMBER COATED WITH THERMAL BARRIER AND METHOD FOR MANUFACTURING THE SAME

BACKGROUND OF THE INVENTION

1. Field of the Invention

The present invention relates to a thermal barrier coating material, a thermal barrier member, and a member coated with thermal barrier which exhibit excellent durability, a method for manufacturing the member coated with thermal barrier, and a gas turbine. More specifically, the present invention relates to the structure of a ceramic layer used as a top coat of the member coated with thermal barrier.

2. Description of the Related Art

In recent years, the elevation of the thermal efficiency of thermal power generation has been studies as one of energy saving measures. In order to improve the power generation efficiency of a gas turbine, the elevation of the gas inlet temperature is effective, and in some cases, the temperature is elevated to about 1500° C. In order to realize the temperature elevation in power generators, it is required in the gas turbine to construct a stationary blade, moving blade or the wall of the burner with heat-resistant members. However, although the material of the turbine blades is a refractory metal, it cannot resist such a high temperature. Therefore, the refractory-metal substrate is protected from high temperatures by forming a thermal barrier coating (TBC). The thermal barrier coating is formed by laminating ceramic layers composed of oxide ceramics on the refractory-metal substrate through a metal bonding layer using a film-forming method such as thermal spray coating. As the ceramic layer, a $ZrO_2$-based material, especially a YSZ (yttria-stabilized zirconia) in which $ZrO_2$ is partially or completely stabilized with especially $Y_2O_3$, is often used because it is a ceramic material having a relatively low thermal conductivity and a relatively high coefficient of thermal expansion.

It is considered that the inlet temperature of the gas turbine can be elevated to a temperature higher than 1500° C. in some types of gas turbines. When the gas turbine is operated at such a high temperature and even if the stationary blade and the moving blade of a gas turbine are coated with a thermal barrier coating material comprising the ceramic composed of YSZ, there has been a risk that a part of the ceramic layer is peeled off and heat resistance is lost during the operation of the gas turbine under severe operating conditions. In recent years, it is expected in view of higher thermal efficiency that inlet temperature of the turbine reaches as high as 1700° C. so that the surface temperature of turbine blades elevates to as high as 1300° C. Therefore, further higher heat resistance has been required for the thermal barrier coating of turbine blades.

The above-described problem of the separation of the ceramic layer of YSZ is caused by that the stability of YSZ crystals is insufficient in a high-temperature environment, and the YSZ crystals do not have sufficient durability against a large thermal stress. In order to solve such a problem a member coated with thermal barrier coating material comprising a zirconia layer stabilized with $Yb_2O_3$, or a zirconia $ZrO_2$ layer stabilized with $Yb_2O_3$ and $Er_2O_3$ has been proposed in Japanese Patent Application Unexamined Publication No. 2003-160852.

SUMMARY OF THE INVENTION

The present invention provides a thermal barrier coating material, a thermal barrier member, and a member coated with thermal barrier which can suppress the separation when used at high temperatures and have a high thermal barrier effect, a method for manufacturing the member coated with thermal barrier, a turbine member coated with the thermal barrier coating material, and a gas turbine.

The present invention provides a thermal barrier coating material for a heat-resistant substrate preferably used in a gas turbine or the like, the material comprising $Sm_2Zr_2O_7$. The present invention also provides a thermal barrier member containing a sintered body of $Sm_2Zr_2O_7$ or $Gd_2Zr_2O_7$, as well as a member coated with thermal barrier comprising a heat-resistant substrate, a bond coat layer formed on the heat-resistant substrate, and a ceramic layer formed on the bond coat layer, wherein the ceramic layer comprises $Sm_2Zr_2O_7$.

The present invention also provides a member coated with thermal barrier comprising a heat-resistant substrate, a bond coat layer formed on the heat-resistant substrate, and a ceramic layer formed on the bond coat layer, wherein the ceramic layer comprises a ceramic represented by the general formula $A_2Zr_2O_7$, wherein A represents a rare earth element, and the ceramic layer has (a) a porosity of 1 to 30%, (b) vertical cracks in a thickness direction in pitches of 5 to 100% the total thickness of layer(s) other than the bond coat layer on the heat-resistant substrate, or (c) columnar crystals. The member coated with thermal barrier preferably comprises a zirconia-containing layer between the bond coat layer and the ceramic layer, wherein the zirconia-containing layer preferably has (a) a porosity of 1 to 30%, or (b) vertical cracks in a thickness direction in pitches of 5 to 100% the total thickness of layer(s) other than the bond coat layer on the heat-resistant substrate.

The present invention provides a gas turbine comprising the member coated with thermal barrier.

The present invention provides a method for manufacturing a member coated with thermal barrier comprising a step of forming a bond coat layer on a heat-resistant substrate, and a step of forming a $Sm_2Zr_2O_7$-containing ceramic layer on the bond coat layer.

The present invention also provides a method for manufacturing a member coated with thermal barrier comprising a step of forming a bond coat layer on a heat-resistant substrate and a step of forming an $A_2ZR_2O_7$-containing ceramic layer on the bond coat layer. The method preferably comprises a step of forming a zirconia-containing layer between the step of forming a bond coat layer and the step of forming a ceramic layer. The step of forming a ceramic layer, or if applicable, the step of forming a zirconia-containing layer preferably comprises (a) a step of introducing pores, or (b) a step of introducing vertical cracks in the thickness direction.

The present invention provides a method for manufacturing a member coated with thermal barrier, comprising a step of forming a bond coat layer on a heat-resistant substrate, and forming a ceramic layer of columnar crystals represented by the general formula $A_2Zr_2O_7$, wherein A represents a rare earth element, on the bond coat layer using electron beam physical vapor deposition.

According to the present invention, a thermal barrier member, a thermal barrier coating material, and a member coated with thermal barrier which have excellent heat resistance and excellent thermal cycle durability can be provided. If these are used in a gas turbine, a highly reliable gas turbine can be manufactured.

DETAILED DESCRIPTION OF THE PREFERRED EMBODIMENTS

Figure 1:
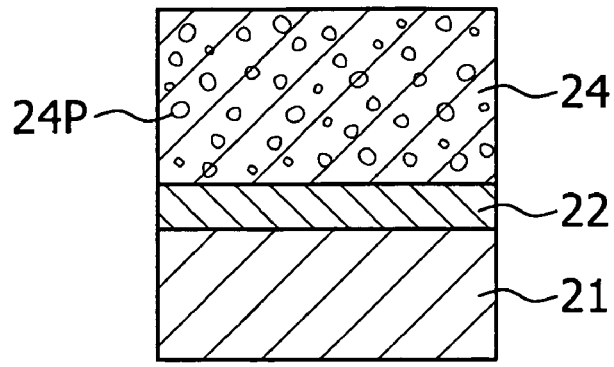
FIG. 1 is a sectional view schematically showing a member coated with thermal barrier according to the second embodiment of the present invention.

The heat-resistant substrate (where the substrate includes a base or base material) to be used in the present invention may include a heat-resistant alloy. The heat-resistant alloy may include CM247L (manufactured by Cannon Muskegon Corp.) used in a moving blade of a gas turbine, and IN939 (manufactured by Inco Ltd.) used in a stationary blade of a gas turbine. The part using the heat-resistant substrate may preferably include parts for gas turbines, such as parts used in turbine stationary blades, turbine moving blades, partitioning rings and burners. Although required heat resistance depends on the uses, it is preferable to resist a temperature of 700° C. or above.

According to the present invention, a bond coat layer is formed on a heat-resistant substrate.

The bond coat layer can have a high oxidation resistance, and can reduce the difference in the coefficients of thermal expansion between the heat-resistant substrate and the ceramic layer, or between the heat-resistant substrate and the zirconia-containing layer so as to relax thermal stress. Therefore, utilizing the high oxidation resistance, long-time durability and excellent thermal cycle durability can be obtained so that the separation of the ceramic layer or the zirconia-containing layer from the bond coat layer can be prevented. The bond coat layer can also strongly tie the heat-resistant substrate and the ceramic layer together, or the heat-resistant substrate and the zirconia-containing layer together so that the strength of the thermal barrier coating material can be improved.

When a porous layer or a layer having vertical cracks is formed on the bond coat layer, it is preferable that a material having excellent oxidation resistance and corrosion resistance is used for the bond coat layer in order to prevent oxidation or corrosion of the heat-resistant substrate at high temperatures. It is also preferable the bond coat layer is of material having excellent ductility to efficiently relax generated stress.

The bond coat layer may be preferably of a MCrAlY alloy ("M" represents a metal element), which has excellent corrosion resistance and oxidation resistance. "M" is preferably a single metal element such as Ni, Co and Fe, or a combination of two or more of these elements.

The methods for forming the bond coat layer may include, but not limited to, low-pressure plasma spray coating and electron-beam physical vapor deposition.

The thickness of the bond coat layer may preferably include, but not limited to, 0.01 to 1 mm. If the thickness is less than 0.01 mm, oxidation resistance may be insufficient; and if the thickness exceeds 1 mm, the ductility or tenacity may be insufficient.

According to the present invention, a ceramic layer represented by the general formula $A_2Zr_2O_7$ (wherein A represents a rare earth element) is formed as top coating. Herein, the rare earth element means Sc, Y, and 15 lanthanoid elements.

The examples of ceramics represented by the general formula $A_2Zr_2O_7$ may include preferably $La_2Zr_2O_7$, $Nd_2Zr_2O_7$, $Sm_2Zr_2O_7$, $Gd_2Zr_2O_7$, $Dy_2Zr_2O_7$, $Er_2Zr_2O_7$, $Yb_2Zr_2O_7$ and $Lu_2Zr_2O_7$, and more preferably $Sm_2Zr_2O_7$ because of low thermal conductivity at 800° C. or above.

As methods for synthesizing $A_2Zr_2O_7$, a powder mixing method, a coprecipitation method, or an alkoxide method has been known. The powder mixing method is a method comprising steps of mixing $A_2O_3$ powder and $ZrO_2$ powder in a slurry state using a ball mill or the like, drying the slurry, then heating the powder to produce $A_2Zr_2O_7$ by a solid-phase reaction method, and pulverizing to yield the powder. The coprecipitation method is a method comprising steps of adding a neutralizing agent such as ammonia to a solution of A and Zr salts to form a hydrate precipitation, heating for allowing them to react to form $A_2Zr_2O_7$, and pulverizing to yield the powder. The alkoxide method is a method comprising steps of adding water to a solution of A and Zr alkoxides in an organic solvent to form a hydrate precipitation, drying for allowing them to react to form $A_2Zr_2O_7$, and pulverizing to yield the powder.

The thermal barrier coating material comprising $A_2Zr_2O_7$ is obtained by granulating the slurry of $A_2Zr_2O_7$ powder, water, a dispersing agent and a binder using a spray dryer into spherical granules, and heating the granules. Alternately, the thermal barrier coating material comprising $A_2Zr_2O_7$ can be obtained by spray-drying the slurry obtained in the stage of mixing the raw materials for $A_2Zr_2O_7$ into spherical particles and heating the particles to yield a powder.

As $A_2Zr_2O_7$, for example, when a spray coating method is used as a processing method, a thermal barrier coating material comprising $Sm_2Zr_2O_7$ is preferably classified into particles having diameters of 10 to 200 μm, and used after adjustment of the particle size suitable for the spray coating. When the electron-beam physical vapor deposition method is used, a sintered ingot can be used as a target material.

A method for forming an $A_2Zr_2O_7$ layer on a bond coat layer may include an atmospheric pressure plasma spray coating method and an electron-beam physical vapor deposition method.

As a method for forming an $A_2Zr_2O_7$ layer using an atmospheric pressure plasma spray coating method, for example, using a spray-coating gun manufactured by Sulzer Meteco (Japan) Ltd. (e.g., F4 Gun), a film can be formed from the powder used in the spray coating method under typical conditions of a spray-coating current of 600 (A), a spray-coating distance of 150 (mm), a powder supply quantity of 60 (g/min), and an $Ar/H_2$ volume ratio of 35/7.4 (l/min).

As a method for forming an $A_2Zr_2O_7$ layer using the electron-beam physical vapor deposition method, for example, using an electron-beam vapor deposition apparatus manufactured by Ardennes (e.g., TUBA150), a film can be formed using the ingot as a target material under typical conditions of an electron-beam output of 50 kW, a reduced-pressure environment of $10^{-4}$ torr, and a temperature of the heat-resistant substrate of 1,000° C.

Columnar crystals is a crystal which is obtained by forming nucleus on the surface of the bond coat and growing in a state of a single crystal to the priority crystal growing direction. Since the crystals are separated from each other even when strain is applied to the heat-resistant substrate, high durability is obtained.

When no zirconia-containing layer is used, the thickness of the ceramic layer may be, but not limited to, preferably 0.1 to 1 mm. If the thickness is less than 0.1 mm, thermal barrier performance may be insufficient. If it exceeds 1 mm, thermal cycle durability may be insufficient. When the ceramic layer has pores or vertical cracks, the thickness of the ceramic layer may be preferably 0.1 to 1 mm.

When $Sm_2Zr_2O_7$ is used as the ceramic layer, since thermal conductivity is lowered, the film thickness can be reduced. According to S. Bose, Journal of Thermal Spray Technology, Vol. 6 (1), March 1997, pp. 99-104, thermal cycle durability is improved when the film thickness is reduced. This report backs up high thermal cycle durability of $Sm_2Zr_2O_7$ that can be thinned while maintaining the same thermal barrier effect. Thus, $Sm_2Zr_2O_7$ is preferable because of not only low thermal conductivity but also high thermal cycle durability.

The ceramic layer may have a porosity (volume occupancy ratio of pores formed in the ceramic layer to the ceramic layer) of preferably 1 to 30%. Since the presence of pores improves the thermal barrier characteristics of the ceramic-containing layer and lowers the Young's modulus thereof, even if high thermal stress is applied to the ceramic layer accompanying thermal cycles, the stress can be relaxed. Therefore, the member coated with thermal barrier that excels in thermal cycle durability can be obtained.

If the porosity is less than 1%, the Young's modulus is high because the ceramic layer is dense. Accordingly, when thermal stress is high, separation may be apt to occur. If the porosity exceeds 30%, adhesion to the bond coat layer or the zirconia-containing layer may be insufficient so that durability may be lowered.

The porosity of the ceramic layer can be easily controlled by controlling a spray coating condition so that a ceramic layer having appropriate porosity can be formed. The controllable spray coating condition may include spray coating current, plasma gas flow rate, and spray coating distance.

For the spray coating current, for example, by lowering the current from normal 600 (A) to 400 (A), the porosity can be increased from about 5% to about 8%. The elevation of the current can lower the porosity.

For the plasma gas flow rate, for example, by increasing the hydrogen flow rate ratio from a typical $Ar/H_2$ ratio of 35/7.4 (l/min) to 37.3/5.1 (l/min), the porosity can be increased from about 5% to about 8%. The increase of the hydrogen quantity can lower the porosity.

For the spray coating distance, for example, by increasing the distance from typical 150 mm to 210 mm, the porosity can be increased from about 5% to 8%. The decrease of the spray coating distance can lower the porosity. Furthermore, by combining these, the porosity can be varied from about 1% to a maximum of about 30%.

According to the present invention, the ceramic layer may preferably have a plurality of vertical cracks extending in the film thickness direction. The vertical cracks may be intentionally introduced when the zirconia-containing layer is formed to improve the separation resistance of the zirconia-containing layer.

When thermal cycles due to the start and shutdown of the turbine is applied to the ceramic layer having a lower coefficient of thermal expansion than the heat-resistant substrate or the bond coat layer, the stress is caused by the difference in the coefficient of thermal expansion. However, the vertical cracks can relax the stress applied to the ceramic layer by expanding or shrinking the widths of the vertical cracks.

Therefore, the stress caused by the expansion and shrinkage due to thermal cycles is little applied to the ceramic layer itself so that the separation of the ceramic layer becomes extremely difficult to happen and the ceramic layer has excellent thermal cycle durability.

According to the present invention, vertical cracks can be introduced in the ceramic layer when spray coating is performed using spray coating powder. Film formation using a spray coating method may be performed by spraying the powder in a melted or partially melted state onto a heat-resistant substrate, and rapidly cooling and solidifying the powder on the surface of the heat-resistant substrate. By increasing temperature change when the powder is solidified on the surface of the heat-resistant substrate, solidification cracks may be intentionally produced in the ceramic layer. Thus, vertical cracks can be introduced in the ceramic layer.

The cracks produced in the ceramic layer may cause the separation of the ceramic layer in thermal barrier coating materials of conventional configurations. However, the vertical cracks introduced in the ceramic layer according to the present invention do not cause separation. This is because the crystal structure in the vicinity of the vertical cracks differs from that in the vicinity of the cracks in the ceramic layer produced by thermal cycles. Regarding the cracks produced by thermal cycles, the crystal phase of $ZrO_2$ changes from the t'-phase (metastable tetragonal phase) to the t-phase (tetragonal phase) and the C-phase (cubic phase) at high temperatures; and when the temperature of the thermal barrier coating material is lowered, the t-phase, which is stable at high temperatures, changes to the m-phase (monoclinic phase) and C-phase (cubic phase). When the m-phase is formed, the volume change occurs. The m-phase is observed in the circumferential part of the cracks produced by the volume change. Therefore, since the phase transition of the m-phase and t-phase occurs repeatedly by thermal cycles, the cracks are gradually developed, and finally, the ceramic layer is separated.

On the other hand, regarding the vertical cracks introduced in the ceramic layer according to the present invention, since the m-phase is little present in the circumferential part thereof, little volume change due to phase transition occurs in the ceramic layer during thermal cycles so that the vertical cracks are hardly developed by the temperature change due to the thermal cycles. Therefore, it is considered that the life of the ceramic layer is not shortened by the introduction of the vertical cracks.

The extending direction of the vertical cracks may be preferably within ±40° to the normal line direction (vertical direction in the drawings) of the film surface. Since cracks in the surface direction of the ceramic layer easily cause the separation of the ceramic layer, the extending direction of the vertical cracks is preferably parallel to the normal line direction of the film surface of the ceramic layer as much as possible. However, if the tilt is within ±40° to the normal line direction of the film surface, the effect of preventing the separation of the ceramic layer can be sufficiently obtained.

The preferable range of the extending direction of the vertical cracks may be within ±20° to the normal line direction of the film surface of the ceramic layer.

The distance (pitch) between vertical cracks in the ceramic layer may be preferably 5 to 100% the total thickness of the films formed on the heat-resistant substrate (excluding the bond coat layer). For example, if the thickness of the ceramic layer is 0.5 mm, the pitch between the vertical cracks is preferably within a range of 0.025 mm or more and 0.5 mm or less. By introducing vertical cracks at such a pitch in the ceramic layer, a member coated with thermal barrier comprising a ceramic layer having excellent separation resistance can be obtained.

If the pitch is less than 5%, the bonding area with the underlying bond coat layer or the zirconia-containing layer may be narrowed, and the adhering power may be insufficient so that separation may be apt to happen. If the pitch exceeds 100%, a specific stress in the separation direction may increase at the ends of the cracks leading to separation.

A ceramic layer having vertical cracks can be formed during the formation of the ceramic layer using, for example, a spray coating method or an electron-beam physical vapor deposition method.

When a ceramic layer having vertical cracks is formed using a spray coating method, the vertical cracks can be introduced by shortening the spray coating distance (distance between a spray gun and a heat-resistant substrate) to about ¼ to ⅔ the spray coating distance conventionally used in the formation of a zirconia layer. Alternately, the vertical cracks can be introduced by using the spray coating distance substantially same as in conventional methods, and elevating the electric power inputted to the spray gun to about 2 to 25 times the conventionally used electric power. In other words, by elevating the temperature of the particles in a melted or partially melted state which fly to the heat-resistant substrate comprising the bond coat layer or the zirconia-containing layer by spraying, the temperature gradient when the particles are quenched and solidified on the heat-resistant substrate can be increased, and vertical cracks can be introduced by shrinkage on solidifying. According to this method, by adjusting the spray coating distance and/or the input electric power to the spray gun, the distance or the frequency (area density of vertical cracks) of vertical cracks can be easily controlled so that a ceramic layer having desired properties can be formed. Thus, a member coated with thermal barrier having excellent separation resistance and thermal cycle durability can be easily formed.

When a ceramic layer having vertical cracks is formed using the electron-beam physical vapor deposition method, for example, with an electron-beam vapor deposition apparatus manufactured by Ardennes (e.g., TUBA150), a ceramic layer having vertical cracks can be easily formed using the ingot as a target material under typical conditions of an electron-beam output of 50 kW, a reduced-pressure environment of $10^{-4}$ torr, and the temperature of a heat-resistant substrate of 1,000° C.

According to the present invention, the top coat can comprise two layers of a zirconia-containing layer and a ceramic layer. In this case, a bond coat layer, a zirconia-containing layer, and a ceramic layer are sequentially formed from the surface of the heat-resistant substrate outwardly. The zirconia-containing layer may be preferably a layer of partially stabilized zirconia. By partially stabilizing zirconia, the stability of zirconia crystals is improved. Accordingly, even when it is used in a high-temperature part of a turbine or the like, the crystal phase of zirconia is difficult to change during thermal cycles so that the formation and development of cracks due to phase transformation can be prevented. Therefore, it has excellent separation resistance, excels in thermal cycle durability, and is suitable for high-temperature parts.

The partially stabilizing zirconia may preferably include zirconia stabilized by one or more selected from the group consisting of $Yb_2O_3$, $Y_2O_3$, $Dy_2O_3$, and $Er_2O_3$.

In the case of zirconia stabilized by $Yb_2O_3$, the content of the stabilizing agent $Yb_2O_3$ may be preferably 8 to 27% by weight in view of thermal cycle durability.

In the case of zirconia stabilized by $Yb_2O_3$ and $Er_2O_3$, the contents of stabilizing agents $Yb_2O_3$ and $Er_2O_3$ may be 0.1 to 25% by weight and 0.1 to 25% by weight, respectively, and the total content of $Yb_2O_3$ and $Er_2O_3$ may be 10 to 30% by weight.

Even when the top coat comprises two layers of a zirconia-containing layer and a ceramic layer, the thickness of the entire top coat may be preferably 0.1 to 1 mm. In this case, the thickness of each of the zirconia-containing layer and the ceramic layer may be preferably 10 to 90% of the total thickness of the films formed on the heat-resistant substrate (excluding the bond coat layer). The same applies to the case wherein the zirconia-containing layer and/or the ceramic layer have pores or vertical cracks.

The zirconia-containing layer can be formed using heretofore known methods. For example, a zirconia-containing layer stabilized by $Yb_2O_3$ can be formed by mixing $Yb_2O_3$ powder and $ZrO_2$ powder to produce spray coating powder, and using a spray coating method. A zirconia-containing layer stabilized by $Yb_2O_3$ and $Er_2O_3$ can be formed by mixing $Yb_2O_3$ powder, $Er_2O_3$ powder and $ZrO_2$ powder to produce spray coating powder, and using a spray coating method. Thereby, a partially stabilized zirconia layer that excels in crystal stability and separation resistance can be easily manufactured at a high yield. The spray coating method may include an atmospheric pressure plasma spray coating method. However, the method is not limited to the spray coating method, but electron beam physical vapor deposition can also be used for laminating.

When the atmospheric pressure plasma spray coating method is used, for example, $ZrO_2$ powder and a predetermined adding ratio of $Yb_2O_3$ powder are provided and mixed in a ball mill together with an appropriate binder or dispersing agent to form a slurry. Next, the slurry is dried in form of granules with a spray dryer, and is subjected to a diffusion heat treatment at 1200 to 1600° C. to yield a solid solution. Consequently, $ZrO_2$—$Yb_2O_3$ composite powder wherein $Yb_2O_3$ is evenly dispersed is obtained. Then, the composite powder is sprayed on a bond coat layer to form a YbSZ layer.

When the electron-beam physical vapor deposition method is used for forming a zirconia-containing layer, an ingot which has been formed by sintering or fusing and solidifying raw material having a predetermined composition is used.

When zirconia stabilized by $Yb_2O_3$ and $Er_2O_3$ is used, $ZrO_2$ powder, a predetermined adding ratios of $Yb_2O_3$ powder and $Er_2O_3$ powder are provided, $ZrO_2$—($Yb_2O_3$+$Er_2O_3$) composite powder may be produced in the same manner as described above. The spray coating or electron-beam physical vapor deposition using this composite powder can be performed to produce a zirconia layer stabilized by $Yb_2O_3$ and $Er_2O_3$ on the bond coat layer.

The zirconia-containing layer has a porosity (volume occupancy ratio of pores in a zirconia-containing layer to the zirconia-containing layer) of preferably 1 to 30%. The presence of pores can improve thermal barrier properties of the partially stabilized zirconia-containing layer. Even when high thermal stress is applied to the zirconia-containing layer due to thermal cycles, the stress can be relaxed. Therefore, a member coated with thermal barrier that excels in thermal cycle durability can be obtained.

If the porosity is less than 1%, the Young's modulus is high due to denseness so that separation may be apt to occur when the thermal stress is high. If the porosity exceeds 30%, the adhesiveness to the bond coat may become insufficient so that durability may be lowered.

The porosity of a zirconia-containing layer can be controlled by adjusting spray coating current or spray coating distance so that a zirconia-containing layer having an appropriate porosity can be formed. Thus, a member coated with thermal barrier having excellent separation resistance can be obtained.

The porosity can be increased, for example, from about 5% to about 8% by lowering the spray coating current from normal 600 (A) to 400 (A). The porosity can be lowered by increasing the spray coating current.

When the flow rate of hydrogen in the plasma gas flow is increased, for example, from 35/7.4 (l/min), which is a typical Ar/$H_2$ ratio, to 37.3/5.1 (l/min), the porosity can be increased from about 5% to about 8%. The porosity can be lowered by increasing the quantity of hydrogen.

By increasing the spray coating distance, for example, from normal 150 mm to 210 mm, the porosity can be increased from about 5% to 8%. Decrease of the spray coating distance can lower the porosity. Furthermore, by combining these, the porosity can be varied from about 1% to a maximum of about 30%.

According to the present invention, it is preferable that the zirconia-containing layer has a plurality of vertical cracks extending in the film thickness direction. The vertical cracks may be intentionally introduced to improve the separation resistance of the zirconia-containing layer when the zirconia-containing layer is formed.

When thermal cycles accompanying the start and shutdown or the like of the turbine are applied to the zirconia-containing layer having a smaller coefficient of thermal expansion than the heat-resistant substrate or the bond coat layer, stress is caused by difference in the coefficient of thermal expansion. However, the stress applied to the zirconia-containing layer can be relaxed because the vertical cracks expand or shrink the width thereof.

Therefore, the stress due to the expansion and shrinkage due to thermal cycles is little applied to the zirconia-containing layer itself so that the separation of the partially stabilized zirconia-containing layer is extremely difficult to occur and thermal cycle durability becomes excellent.

According to the present invention, vertical cracks can be introduced to the zirconia-containing layer when spray coating is performed using spray coating powder. The film formation using a spray coating method is performed by spraying powder in a melted or partially melted state into a heat-resistant substrate, and rapidly cooling and solidifying the molten powder on the surface of the heat-resistant substrate. By increasing temperature change when the molten powder is solidified on the surface of the heat-resistant substrate, and intentionally forming solidifying cracks in the formed zirconia-containing layer, the vertical cracks can be introduced in the zirconia-containing layer.

The cracks formed in the zirconia-containing layer caused the separation of the zirconia-containing layer in the thermal barrier coating material of conventional configurations. However, the vertical cracks introduced in the zirconia-containing layer according to the present invention do not cause separation. This is because the crystal structure around the vertical cracks is different from the crystal structure around the cracks in the zirconia-containing layer produced by thermal cycles. Regarding the cracks produced by thermal cycles, the crystal phase of $ZrO_2$ changes from a t'-phase (metastable tetragonal phase) to a t-phase (tetragonal phase) and a C-phase (cubic phase) in a high temperature environment, and when the temperature of the thermal barrier coating material lowers, the t-phase, which is stable in a high-temperature phase, is changed to a m-phase (monoclinic phase) and a C-phase (cubic phase) due to the decrease in temperature. A volume change occurs when the m-phase is formed. Around the cracks produced by volume change, the in-phase can be observed. Therefore, since the phase transitions between the m-phase and the t-phase are repeated, the cracks are gradually developed, and finally separate the zirconia-containing layer.

On the other hand, regarding the vertical cracks introduced in the zirconia-containing layer according to the present invention, since the m-phase is substantially absent around the vertical cracks, little volume change occurs due to phase transitions during thermal cycles in the zirconia-containing layer. Thus, the vertical cracks are little developed by temperature change due to thermal cycles. Therefore, it is considered that the introduction of the vertical cracks does not shorten the life of the zirconia-containing layer.

The extending direction of the vertical cracks may be preferably within ±40° to the normal line direction of the film surface (vertical direction in the drawing). Since the cracks in the surface of the zirconia-containing layer facilitate to cause the separation of the zirconia-containing layer, the extending direction of the vertical cracks is preferably parallel to the normal line direction of the film surface of the zirconia-containing layer as much as possible. However, if the tilt is within ±40° to the normal line direction of the film surface, the effect of preventing the separation of the zirconia-containing layer can be sufficiently obtained.

The preferable range of the extending direction of the vertical cracks may be within ±20° to the normal line direction of the film surface of the zirconia-containing layer.

The distance (pitch) between vertical cracks in the zirconia-containing layer may be preferably 5 to 100% the total thickness of the films formed on the heat-resistant substrate (excluding the bond coat layer). By introducing vertical cracks at such a pitch in the zirconia-containing layer, a member coated with thermal barrier comprising a zirconia-containing layer having excellent separation resistance can be obtained. If the pitch is less than 5%, the bonding area with the underlying bond coat layer of the zirconia-containing layer may be narrowed, and the adhering power may be insufficient so that separation may be apt to occur. If the pitch exceeds 100%, a specific stress in the separation direction may increase at the ends of the cracks leading to separation.

A zirconia-containing layer having vertical cracks can be formed during the formation of the zirconia-containing layer using, for example, a spray coating method or an electron-beam physical vapor deposition method.

When a zirconia-containing layer having vertical cracks is formed using the spray coating method, the vertical cracks can be introduced by shortening the spray coating distance (distance between a spray gun and a heat-resistant substrate) to about ¼ to ⅔ the spray coating distance conventionally used in the formation of a zirconia-containing layer. Alternately, the vertical cracks can be introduced by using the spray coating distance substantially same as in conventional methods, and elevating the electric power inputted to the spray gun to about 2 to 25 times the conventionally used electric power. In other words, by elevating the temperature of the particles in a melted or partially melted state which fly to the heat-resistant substrate having the bond coat layer by spraying, the temperature gradient when the particles are quenched and solidified on the heat-resistant substrate can be increased. Consequently, vertical cracks can be introduced by shrinkage on solidifying. According to this method, by adjusting the spray coating distance and/or the input electric power to the spray gun, the distance or the frequency (area density of vertical cracks) of vertical cracks can be easily controlled so that a zirconia-containing layer having desired properties can be formed. Thus, a member coated with thermal barrier having excellent separation resistance and thermal cycle durability can be easily formed.

When a zirconia-containing layer having vertical cracks is formed using the electron-beam physical vapor deposition method, for example, using the electron-beam vapor deposition apparatus manufactured by Ardennes (e.g., TUBA150), a zirconia-containing layer having vertical cracks can be easily formed using the ingot as a target material under typical conditions of an electron-beam output of 50 kW, a reduced-pressure environment of $10^{-4}$ torr, and the temperature of a heat-resistant substrate of 1,000° C.

Some preferred embodiments of the present invention will be described below referring to the drawings. However, the present invention is not limited thereto.

In the first embodiment, a sintered body using a ceramic represented by the general formula $A_2Zr_2O_7$ is produced. As a ceramic represented by the general formula $A_2Zr_2O_7$, $Sm_2Zr_2O_7$ may be preferable. This is because the thermal conductivity is very low at 800° C. or above as shown in the experimental example below. The sintered body is preferably used in parts of a gas turbine.

While a ceramic represented by the general formula $A_2Zr_2O_7$, has a coefficient of linear expansion substantially equivalent to that of YSZ, it has a lower thermal conductivity than YSZ. For example, although the thermal conductivity of a spray-coated YSZ film is 0.74 to 2.02 W/mK, that of $A_2Zr_2O_7$ is normally 0.3 to 1.15 W/mK.

In the second embodiment, a member is coated with thermal barrier comprising a porous ceramic layer as shown in FIG. 1. The member coated with thermal barrier featuring in low thermal conductivity can be obtained. FIG. 1 shows a member coated with thermal barrier comprising a bond coat layer 22 and a layer 24 of a ceramic represented by the general formula $A_2Zr_2O_7$ in sequence on a heat-resistant substrate 21, wherein the ceramic layer 24 has pores 24P. The thickness of the bond coat layer 22 may be 0.01 to 1 mm, and the thickness of the ceramic layer 24 may be 0.1 to 1 mm. The porosity of the ceramic layer 24 may be 1 to 30%.

According to the second embodiment, a member coated with thermal barrier having a low thermal conductivity can be obtained.

Figure 2:
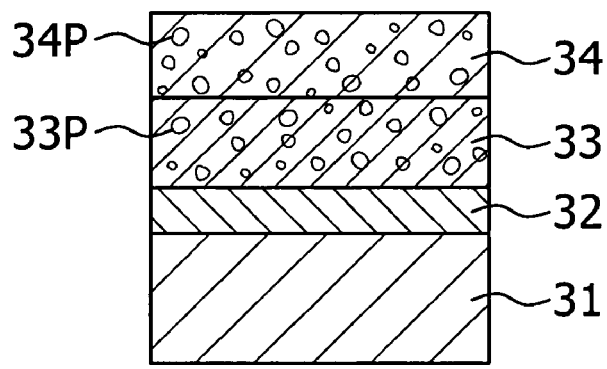
FIG. 2 is a sectional view schematically showing a member coated with thermal barrier according to the third embodiment of the present invention.

In the third embodiment, a member is coated with thermal barrier comprising a porous ceramic layer and a porous zirconia-containing layer as shown in FIG. 2. The member coated with thermal barrier having low thermal conductivity and excellent durability can be obtained. FIG. 2 shows a member coated with thermal barrier comprising a bond coat layer 32, a zirconia-containing layer 33 and a layer 34 of a ceramic represented by the general formula $A_2Zr_2O_7$ in sequence on a heat-resistant substrate 31, wherein the zirconia-containing layer 33 has pores 33P and the ceramic layer 34 has pores 34P. The thickness of the bond coat layer 32 may be 0.01 to 1 mm. The total thickness of the zirconia-containing layer 33 and the ceramic layer 34 may be 0.1 to 1 mm; the thickness of the zirconia-containing layer 33 may be 10 to 90% of the total thickness of the zirconia-containing layer 33 and the ceramic layer 34; and the thickness of the ceramic layer 34 may be 10 to 90% of the total thickness of the zirconia-containing layer 33 and the ceramic layer 34 formed on the heat-resistant substrate 31. The porosity of each of the zirconia-containing layer 33 and the ceramic layer 34 may be 1 to 30%.

According to the third embodiment, high thermal barrier properties can be achieved by the porous zirconia-containing layer and the ceramic layer, and the member coated with the thermal barrier may be advantageous in the costs. The toughness of the zirconia-containing layer can also be expected.

Figure 3:
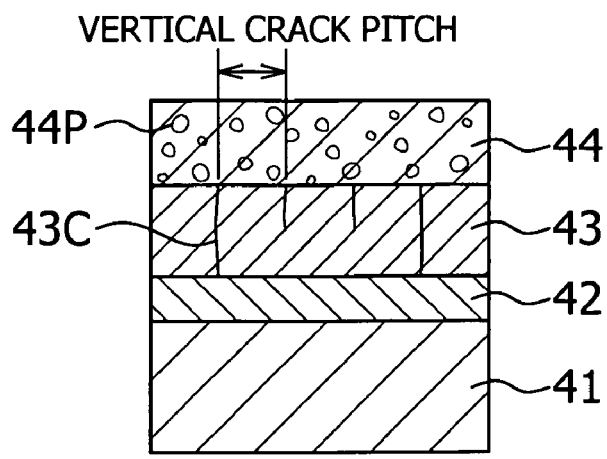
FIG. 3 is a sectional view schematically showing a member coated with thermal barrier according to the fourth embodiment of the present invention.

In the fourth embodiment, a member is coated with thermal barrier comprising a porous ceramic layer and a zirconia-containing layer having vertical cracks as shown in FIG. 3. The member coated with thermal barrier having low thermal conductivity and high durability can be obtained. FIG. 3 shows a member coated with thermal barrier comprising a bond coat layer 42, a zirconia-containing layer 43 and a layer 44 of a ceramic represented by the general formula $A_2Zr_2O_7$ in sequence on a heat-resistant substrate 41, wherein the zirconia-containing layer 43 has vertical cracks 43C and the ceramic layer 44 has pores 44P. The thickness of the bond coat layer 42 may be 0.01 to 1 mm. The total thickness of the zirconia-containing layer 43 and the ceramic layer 44 may be 0.1 to 1 mm; the thickness of the zirconia-containing layer 43 may be 10 to 90% of the total thickness of the zirconia-containing layer 43 and the ceramic layer 44; and the thickness of the ceramic layer 44 may be 10 to 90% of the total thickness of the zirconia-containing layer 43 and the ceramic layer 44 formed on the heat-resistant substrate 41. The distance between vertical cracks (vertical crack pitch) on the zirconia-containing layer 43 may be 5 to 100% of the total thickness of the zirconia-containing layer 43 and the ceramic layer 44. The extending direction of the vertical cracks may be within ±40° to the normal line of the film surface. The porosity of the ceramic layer 44 may be 1 to 30%.

According to the fourth embodiment, thermal barrier properties can be obtained by the porous ceramic layer, while thermal cycle durability can be obtained by the vertical crack structures of the zirconia-containing layer. The toughness of the zirconia-containing layer can also be expected.

Figure 4:
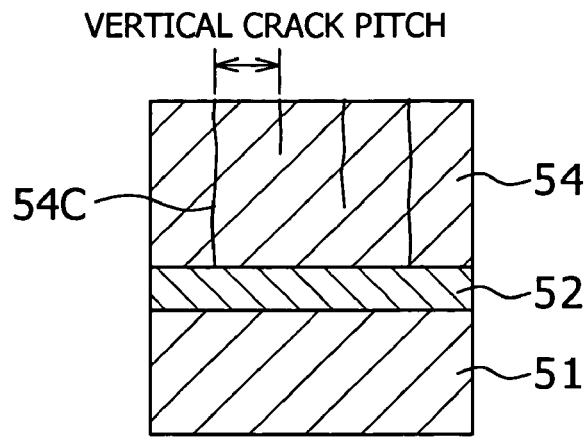
FIG. 4 is a sectional view schematically showing a member coated with thermal barrier according to the fifth embodiment of the present invention.

In the fifth embodiment, a member is coated with thermal barrier comprising a ceramic layer having vertical cracks as shown in FIG. 4. The member coated with thermal barrier featuring in low thermal conductivity can be obtained. FIG. 4 shows a member coated with thermal barrier comprising a bond coat layer 52 and a layer 54 of a ceramic represented by the general formula $A_2Zr_2O_7$ in sequence on a heat-resistant substrate 51, wherein the ceramic layer 54 has vertical cracks 54C. The thickness of the bond coat layer 52 may be 0.01 to 1 mm. The thickness of the ceramic layer 54 may be 0.1 to 1 mm. The vertical crack pitch may be 5 to 100% of the thickness of the ceramic layer 54, and the extending direction of the vertical cracks may be within ±40° to the normal line of the film surface.

According to the fifth embodiment, high thermal cycle durability can be obtained by the vertical crack structures of the ceramic layer.

Figure 5:
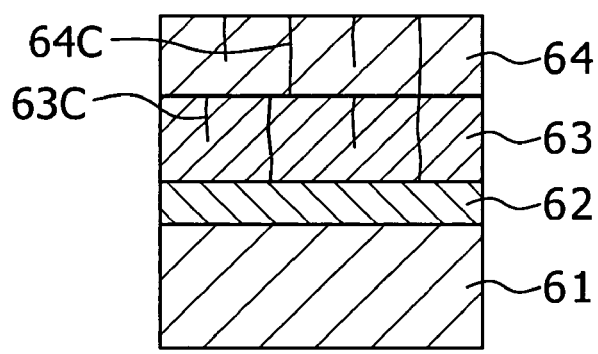
FIG. 5 is a sectional view schematically showing a member coated with thermal barrier according to the sixth embodiment of the present invention.

In the sixth embodiment, a member is coated with thermal barrier comprising a ceramic layer having vertical cracks and a zirconia-containing layer having vertical cracks as shown in FIG. 5 shows. The member coated with thermal barrier having normal thermal conductivity that can expect ultra-high durability can be obtained. FIG. 5 shows a member coated with thermal barrier comprising a bond coat layer 62, a zirconia-containing layer 63, and a layer 64 of a ceramic represented by the general formula $A_2Zr_2O_7$ in sequence on a heat-resistant substrate 61, wherein the zirconia-containing layer 63 has vertical cracks 63C and the ceramic layer 64 has vertical cracks 64C. The thickness of the bond coat layer 62 may be 0.01 to 1 mm. The total thickness of the zirconia-containing layer 63 and the ceramic layer 64 may be 0.1 to 1 mm; the thickness of the zirconia-containing layer 63 may be 10 to 90% of the total thickness of the zirconia-containing layer 63 and the ceramic layer 64; and the thickness of the ceramic layer 64 may be 10 to 90% of the total thickness of the zirconia-containing layer 63 and the ceramic layer 64. The vertical crack pitch of each of the zirconia-containing layer 63 and the ceramic layer 64 may be 5 to 100% of the total thickness of the zirconia-containing layer 63 and the ceramic layer 64, and the extending direction of the vertical cracks may be within ±40° to the normal line of the film surface.

According to the sixth embodiment, thermal cycle durability can be strengthened by the vertical crack structures of the zirconia-containing layer and the ceramic layer. The toughness of the zirconia-containing layer can also be expected.

Figure 6:
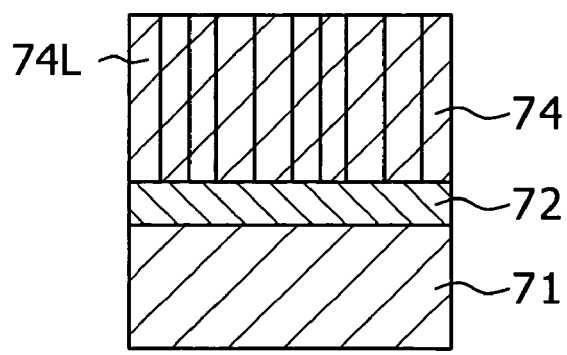
FIG. 6 is a sectional view schematically showing a member coated with thermal barrier according to the seventh embodiment of the present invention.

In the seventh embodiment, a member is coated with thermal barrier wherein the ceramic layer is of a columnar structure using EB-PVD (electron beam physical vapor deposition) as shown in FIG. 6. The member coated with thermal barrier having very high durability and low thermal conductivity can be obtained. FIG. 6 shows a member coated with thermal barrier comprising a bond coat layer 72 and a layer 74 of a ceramic represented by the general formula $A_2Zr_2O_7$ in sequence on a heat-resistant substrate 71, wherein the ceramic layer 74 has a columnar structure 74L. The thickness of the bond coat layer 72 may be 0.01 to 1 mm. The thickness of the ceramic layer 74 may be 0.1 to 1 mm.

According to the seventh embodiment, thermal cycle durability can be improved by the presence of the columnar structure in the ceramic layer. In this case, although thermal conductivity may be inferior to spray coating, the thermal conductivity can be reduced by 20% or more compared with YSZ obtained by EB-PVD.

The member coated with thermal barrier according to the present invention is useful when it is applied to high-temperature parts such as the moving blades and the stationary blades of industrial gas turbines, or the inner cylinders and the tail cylinders of combustors. The member coated with thermal barrier can also be applied not only to the industrial gas turbines, but also to the thermal barrier coating film of the high-temperature parts of engines for motor vehicles or jet aircraft. By coating these members with the thermal barrier coating film of the present invention, gas-turbine members or high-temperature parts that excel in thermal cycle durability can be composed.

Figure 7:
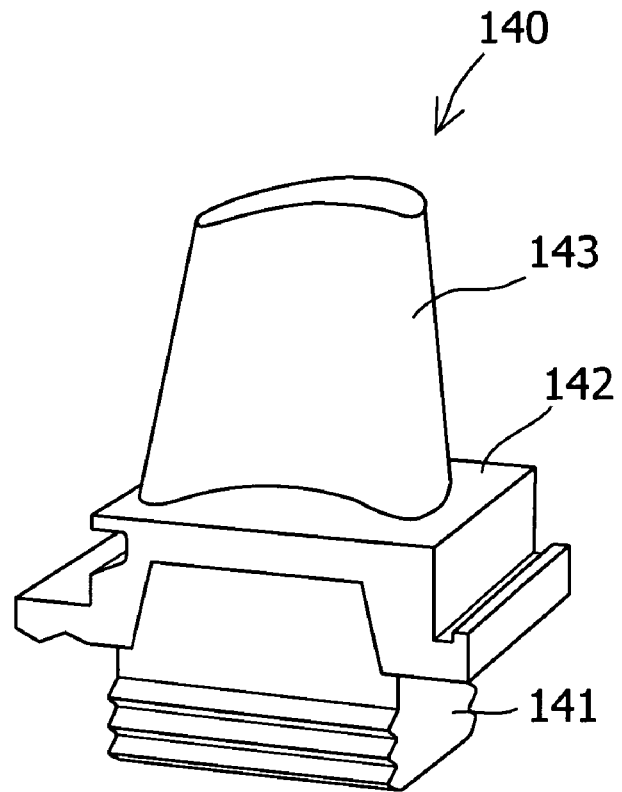
FIG. 7 is a perspective view showing a moving blade, which is an example of the turbine member according to the present invention.
Figure 8:
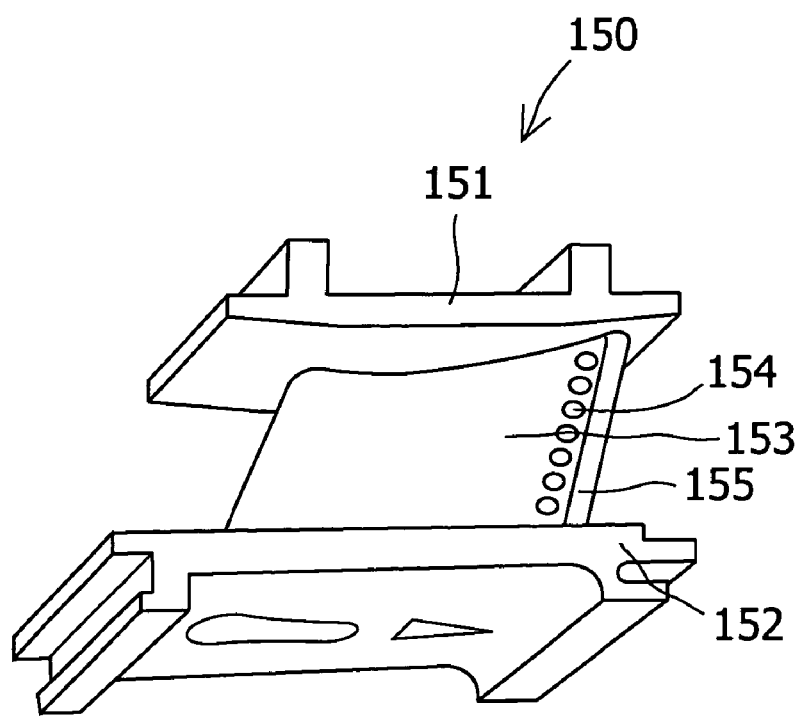
FIG. 8 is a perspective view showing a stationary blade, which is an example of the turbine member according to the present invention.

FIGS. 7 and 8 are perspective views showing the constituting examples of turbine blades (turbine members) to which the thermal barrier coating film of the present invention can be applied. The moving blade 140 for a gas-turbine shown in FIG. 7 is equipped with a tab tail 141 fixed to the disc side, a platform 142, a blade 143 and the like. The stationary blade 150 for a gas-turbine shown in FIG. 8 is equipped with an inner shroud 151, an outer shroud 152, a blade 153 and the like, and seal fin cooling holes 154, a slit 155 and the like are formed in the blade 153.

Figure 9:
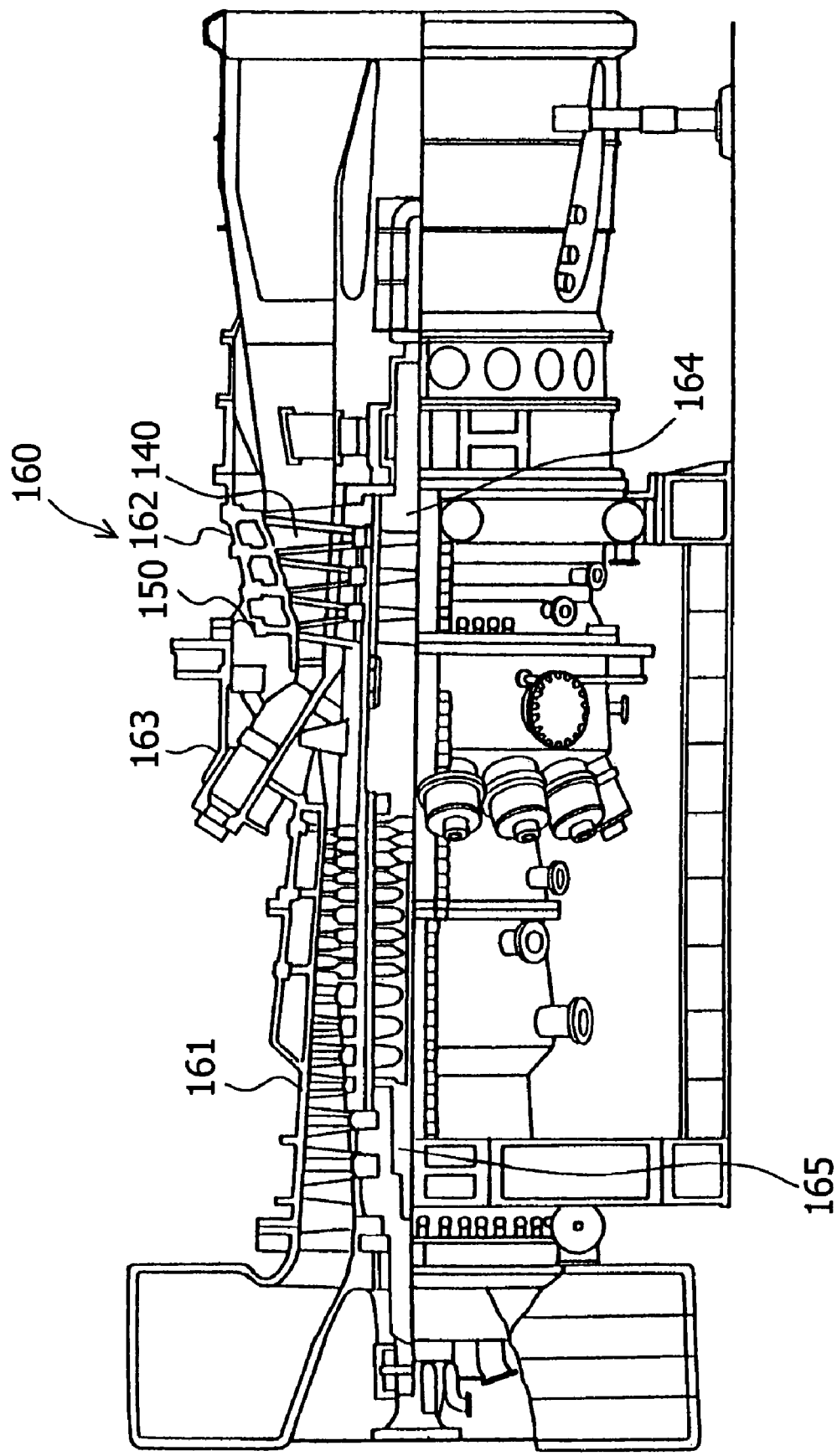
FIG. 9 is a partially sectional view showing an example of a gas turbine equipped with gas turbine members shown in FIGS. 7 and 8.

A gas turbine to which turbine blades 140 and 150 shown in FIGS. 7 and 8, respectively, are applicable, will be described referring to FIG. 9. FIG. 9 is a partially sectional view schematically showing an example of a gas turbine according to the present invention. The gas turbine 160 is equipped with a compressor 161 and a turbine 162 directly connected to each other. The compressor 161 is constituted as an axial flow compressor, and sucks the air or a predetermined gas from a suction port as a working fluid and elevates the pressure thereof. A combustor 163 is connected to the discharge port of the compressor 161, and the working fluid discharged from the compressor 161 is heated by the combustor 163 to a predetermined inlet temperature of the turbine. The working fluid heated to the predetermined temperature is supplied to the turbine 162. As shown in FIG. 9, several stages (4 stages in FIG. 9) of the gas-turbine stationary blades 150 are installed in the casing of the turbine 162. The gas-turbine moving blades 140 are fixed to the main shaft 164 so as to form a set of stage with each stationary blade 150. An end of the main shaft 164 is connected to the rotary shaft 165 of the compressor 161, and the rotary shaft of a power generator (not shown) is connected to the other end.

According to such a configuration, when a high-temperature high-pressure working fluid is supplied from the combustor 163 into the casing of the turbine 162, the working fluid is expanded in the casing to rotate the main shaft 164, and the power generator (not shown) connected to the gas turbine 160 is driven. In other words, the pressure is lowered by each stationary blade 150 fixed to the casing, and thereby the generated kinetic energy is converted to rotation torque through each moving blade 140 fixed to the main shaft 164. Then the generated rotation torque is transmitted to the rotary shaft 165 so that the power generator is driven.

When the member coated with thermal barrier of the present invention is used in these turbine blades, turbine blades that excel in the thermal barrier effect and separation resistance can be produced. Accordingly, the turbine blades can be used in a higher temperature environment and long-life turbine blades having excellent durability can be realized. The possibility of application in a higher temperature environment means that the temperature of the working fluid can be elevated, and thereby, the efficiency of the gas turbine can be improved. Since the member coated with thermal barrier of the present invention excels in thermal barrier properties, it can reduce the flow rate of cooling air and can contribute to the improvement of performance.

The member coated with thermal barrier of the present invention can be applied not only to gas turbines but also to the piston crowns of diesel engines, and the parts of jet engines.

Some preferred examples of the present invention will be described below referring to the drawings. However, it should not be construed that the present invention is limited to these examples.

Examples 1 and 2

Figure 10:
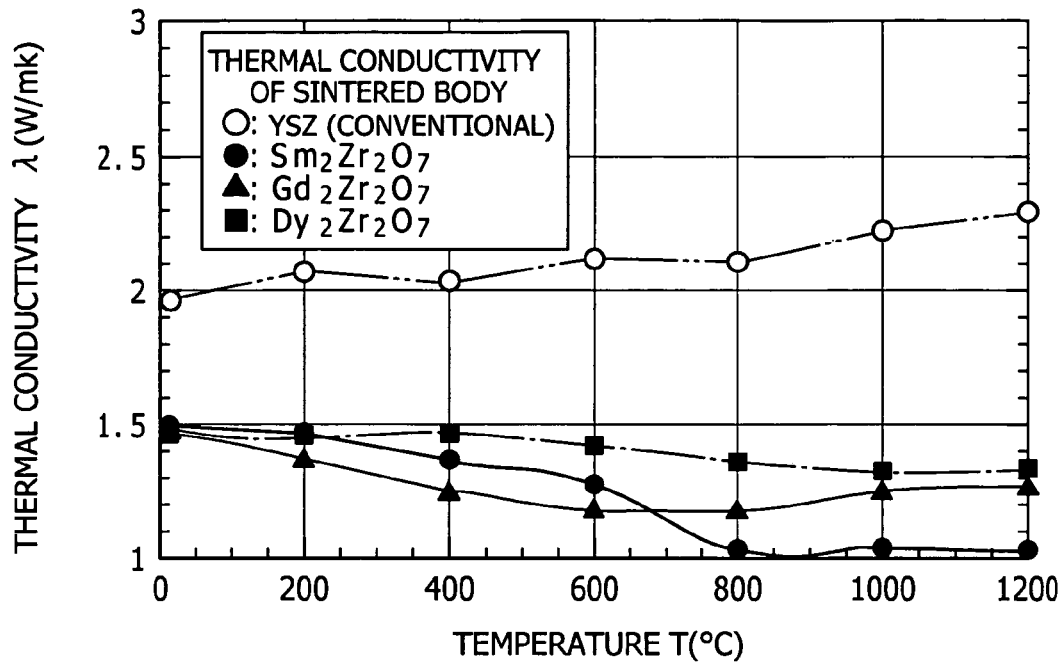
FIG. 10 is a graph showing results of measurement of temperatures and thermal conductivities.

In order to examine the thermal conductivity in a bulk body, a sintered body of $Sm_2Zr_2O_7$, $Gd_2Zr_2O_7$ or $Dy_2Zr_2O_7$ among $A_2Zr_2O_7$ was produced using $Sm_2O_3$ powder, $Gd_2O_3$ powder or $Dy_2O_3$ powder ($Sm_2O_3$ powder, $Gd_2O_3$ powder or $Dy_2O_3$ powder in fine powder 3C Series manufactured by Nippon Yttrium Co., Ltd.) together with $ZrO_2$ powder ($ZrO_2$ in fine powder TZ-0 manufactured by Nippon Yttrium Co., Ltd.) as materials in a ordinary-pressure sintering method under the conditions of a sintering temperature of 1600° C. and a sintering time of 5 hours. Thereafter, the sintered body was cut into samples of a thickness of about 1 mm, and the thermal conductivity of the sintered body was measured using a laser flash method specified in Japanese Industrial Standards (JIS) R1611. The results are shown in FIG. 10.

Comparative Example 1

For the comparison of bulk bodies, a YSZ sintered body containing 8% by weight of $Y_2O_3$ was produced at a sintering temperature of 1600° C. in the same manner as in Example 1. Thereafter, the sintered body was cut into samples of a thickness of about 1 mm, and the thermal conductivity of the sintered body was measured using a laser flash method specified in JIS R1611. The results are shown in FIG. 10. It is evident in FIG. 10 that all the materials having the crystal structure of $A_2Zr_2O_7$ have lower thermal conductivities compared with YSZ wherein the thermal conductivity is lowered by 25% or more.

Examples 3 and 4

Samples were prepared and the thermal cycle life was measured. As a heat-resistant substrate, an Ni-based heat-resistant alloy was used. The composition of alloy was 16 wt % Cr, 8.5 wt % Co, 1.75 wt % Mo, 2.6 wt % W, 1.75 wt % Ta, 0.9 wt % Nb, 3.4 wt % Ti, 3.4 wt % Al and the balance being Ni. The heat-resistant substrate was in form of a disc having a thickness of 5 mm and a diameter of 30 mm.

The surface of the heat-resistant substrate was subjected to grid blasting using $Al_2O_3$ particles, and a bond coat layer of a Co—Ni—Cr—Al—Y alloy having a composition of 32 wt % Ni, 21 wt % Cr, 8 wt % Al, 0.5 wt % Y and the balance being Co with a thickness of 0.1 mm was formed using a low-pressure plasma spray coating method.

On the Co—Ni—Cr—Al—Y bond coat layer, a $Sm_2Zr_2O_7$ or $Gd_2Zr_2O_7$ layer having a thickness of 0.5 mm was formed using an atmospheric pressure plasma spray coating method so as to have a porous structure of a porosity of 10%. In the atmospheric pressure plasma spray coating method, a porous layer was formed using a spray gun (F4 gun) manufactured by Sulzer Metco (Japan) Ltd., and spray coating powder of $Sm_2Zr_2O_7$ (synthesized by a powder mixing method using $Sm_2O_3$ in fine powder 3C Series manufactured by Nippon Yttrium Co., Ltd., and $ZrO_2$ in fine powder TZ-0 manufactured by Nippon Yttrium Co., Ltd.) or $Gd_2Zr_2O_7$ (synthesized by a powder mixing method using $Gd_2O_3$ in fine powder 3C Series manufactured by Nippon Yttrium Co., Ltd., and $ZrO_2$ in fine powder TZ-0 manufactured by Nippon Yttrium Co., Ltd.), under the conditions of a spray coating current of 600 A, a spray coating distance of 150 mm, a powder supply of 60 g/min, and $Ar/H_2$ of 35/7.4 L/min.

The porosity of the formed top coat layer was determined by binarizing the pore portion and the ceramic portion using an image analysis of the observation results of the sectional micro structure.

Examples 5 and 6

The same steps as in Examples 3 and 4 were carried out up to the formation of the bond coat layer. Thereafter, using YSZ spray coating powder (204NS-G manufactured by Sulzer Metco (Japan) Ltd. having a compounding ratio of 8% by weight of yttria and 92% by weight of zirconia), a porous YSZ layer of a thickness of 0.25 mm having a porosity of 10% was formed. The porous YSZ layer was formed by atmospheric pressure plasma spray coating using a spray gun (F4 gun) manufactured by Sulzer Metco (Japan) Ltd. and YSZ spray coating powder under the conditions of a spray coating current of 600 A, a spray coating distance of 150 mm, a powder supply of 60 g/min, and $Ar/H_2$ of 35/7.4 L/min.

Subsequently, a porous layer of $Sm_2Zr_2O_7$ (synthesized by a powder mixing method using $Sm_2O_3$ in fine powder 3C Series manufactured by Nippon Yttrium Co., Ltd., and $ZrO_2$ in fine powder TZ-0 manufactured by Nippon Yttrium Co., Ltd.) or $Gd_2Zr_2O_7$ (synthesized by a powder mixing method using $Gd_2O_3$ in fine powder 3C Series manufactured by Nippon Yttrium Co., Ltd., and $ZrO_2$ in fine powder TZ-0 manufactured by Nippon Yttrium Co., Ltd.) was formed using an atmospheric pressure plasma spray coating method so as to have a porosity of 10% and a thickness of 0.25 mm. The thickness of the entire top coat layer was 0.5 mm. The porous $Sm_2Zr_2O_7$ or $Gd_2Zr_2O_7$ layer was formed by a spray gun manufactured by Sulzer Metco (Japan) Ltd. (e.g., F4 gun) using $Sm_2Zr_2O_7$ or $Gd_2Zr_2O_7$ spray coating powder under the conditions of a spray coating current of 600 A, a spray coating distance of 150 mm, a powder supply of 60 g/min, and an $Ar/H_2$ of 35/7.4 L/min.

Comparative Example 2

The same steps as in Examples 3 and 4 were carried out up to the formation of the bond coat layer. Thereafter, using YSZ spray coating powder (204NS-G manufactured by Sulzer Metco (Japan) Ltd. having a compounding ratio of 8% by weight of yttria and 92% by weight of zirconia), a porous YSZ layer was formed using an atmospheric pressure plasma spray coating method so as to have a thickness of 0.5 mm and a porosity of 10%. The porous YSZ layer was formed using an atmospheric pressure plasma spray coating method by a spray gun (F4 gun) manufactured by Sulzer Metco (Japan) Ltd. using YSZ spray coating powder under the conditions of a spray coating current of 600 A, a spray coating distance of 150 mm, a powder supply of 60 g/min, and $Ar/H_2$ of 35/7.4 L/min.

Examples 7 and 8

The same-steps as in Examples 3 and 4 were carried out up to the formation of the bond coat layer. Thereafter, using YSZ spray coating powder (204NS-G manufactured by Sulzer Metco (Japan) Ltd. having a compounding ratio of 8% by weight of yttria and 92% by weight of zirconia), a YSZ layer of a thickness of 0.25 mm having a vertical crack structure was formed using an atmospheric pressure plasma spray coating method under a high heat inputting condition. The introduction of vertical cracks in the YSZ layer was performed by shortening the spray coating distance (distance between a spray gun and a heat-resistant substrate) from 150 mm, which is the distance conventionally used for the formation of a zirconia-containing layer, to 50 mm; or by using the spray coating distance equivalent to the conventionally used distance, and elevating the spray gun current from 600 A to 700 A. The pitch of the vertical cracks observed by sectional microstructure observation was 0.2 mm.

Subsequently, a porous layer of $Sm_2Zr_2O_7$ (synthesized by a powder mixing method using $Sm_2O_3$ in fine powder 3C Series manufactured by Nippon Yttrium Co., Ltd., and $ZrO_2$ in fine powder TZ-0 manufactured by Nippon Yttrium Co., Ltd.) or $Gd_2Zr_2O_7$ (synthesized by a powder mixing method using $Gd_2O_3$ in fine powder 3C Series manufactured by Nippon Yttrium Co., Ltd., and $ZrO_2$ in fine powder TZ-0 manufactured by Nippon Yttrium Co., Ltd.) was formed using an atmospheric pressure plasma spray coating method so as to have a porosity of 10% and a thickness of 0.25 mm. The thickness of the entire top coat layer was 0.5 mm. The porous $Sm_2Zr_2O_7$ or $Gd_2Zr_2O_7$ layer was formed by a spray gun manufactured by Sulzer Metco (Japan) Ltd. (e.g., F4 gun) using $Sm_2Zr_2O_7$ or $Gd_2Zr_2O_7$ spray coating powder under the conditions of a spray coating current of 600 A, a spray coating distance of 150 mm, a powder supply of 60 g/min, and $Ar/H_2$ of 35/7.4 L/min.

Examples 9 and 10

The same steps as in Examples, 3 and 4 were carried out up to the formation of the bond coat layer. Thereafter, using $Sm_2Zr_2O_7$ (synthesized by a powder mixing method using $Sm_2O_3$ in fine powder 3C Series manufactured by Nippon Yttrium Co., Ltd., and $ZrO_2$ in fine powder TZ-0 manufactured by Nippon Yttrium Co., Ltd.) or $Gd_2Zr_2O_7$ (synthesized by a powder mixing method using $Gd_2O_3$ in fine powder 3C Series manufactured by Nippon Yttrium Co., Ltd., and $ZrO_2$ in fine powder TZ-0 manufactured by Nippon Yttrium Co., Ltd.), a $Sm_2Zr_2O_7$ layer or $Gd_2Zr_2O_7$ layer of a thickness of 0.5 mm having a vertical crack structure was formed in an atmospheric pressure plasma spray coating method under a high heat inputting condition. The introduction of vertical cracks in the $Sm_2Zr_2O_7$ layer or the $Gd_2Zr_2O_7$ layer was performed by shortening the spray coating distance (distance between a spray gun and a heat-resistant substrate) from 150 mm, which is the distance conventionally used for the formation of a zirconia-containing layer, to 100 mm; or by using the spray coating distance equivalent to the conventionally used distance, and elevating the spray gun current from 600 A to 650 A. The pitch of the vertical cracks observed by sectional microstructure observation was 0.2 mm.

Examples 11 and 12

The same steps as in Examples 3 and 4 were carried out up to the formation of the bond coat layer. Thereafter, using YSZ spray coating powder (204NS-G manufactured by Sulzer Metco (Japan) Ltd. having a compounding ratio of 8% by weight of yttria and 92% by weight of zirconia), a YSZ layer of a thickness of 0.25 mm having a vertical crack structure was formed in an atmospheric pressure plasma spray coating method under a high heat inputting condition. The introduction of vertical cracks in the YSZ layer was performed by shortening the spray coating distance (distance between a spray gun and a heat-resistant substrate) from 150 mm, which is the distance conventionally used for the formation of a zirconia-containing layer, to 50 mm; or by using the spray coating distance equivalent to the conventionally used distance, and elevating the spray gun current from 600 A to 700 A. The pitch of the vertical cracks observed by sectional microstructure observation was 0.2 mm.

Thereafter, using $Sm_2Zr_2O_7$ (synthesized by a powder mixing method using $Sm_2O_3$ in fine powder 3C Series manufactured by Nippon Yttrium Co., Ltd., and $ZrO_2$ in fine powder TZ-0 manufactured by Nippon Yttrium Co., Ltd.) or $Gd_2Zr_2O_7$ (synthesized by a powder mixing method using $Gd_2O_3$ in fine powder 3C Series manufactured by Nippon Yttrium Co., Ltd., and $ZrO_2$ in fine powder TZ-0 manufactured by Nippon Yttrium Co., Ltd.), a $Sm_2Zr_2O_7$ layer or $Gd_2Zr_2O_7$ layer of a thickness of 0.25 mm having a vertical crack structure was formed in an atmospheric pressure plasma spray coating method under a high heat inputting condition. The introduction of vertical cracks in the $Sm_2Zr_2O_7$ layer or the $Gd_2Zr_2O_7$ layer was performed by shortening the spray coating distance (distance between a spray gun and a heat-resistant substrate) from 150 mm, which is the distance conventionally used for the formation of a zirconia-containing layer to, 100 mm; or by using the spray coating distance equivalent to the conventionally used distance, and elevating the spray gun current from 600 A to 650 A. The pitch of the vertical cracks observed by sectional microstructure observation was 0.2 mm. The thickness of the entire top coat was 0.5 mm.

Comparative Example 3

The same steps as in Examples 3 and 4 were carried out up to the formation of the bond coat layer. Thereafter, using YSZ spray coating powder (204NS-G manufactured by Sulzer Metco (Japan) Ltd. having a compounding ratio of 8% by weight of yttria and 92% by weight of zirconia), a YSZ layer of a thickness of 0.5 mm having a vertical crack structure was formed in an atmospheric pressure plasma spray coating method under a high heat inputting condition. The introduction of vertical cracks in the YSZ layer was performed by shortening the spray coating distance (distance between a spray gun and a heat-resistant substrate) from 150 mm, which is the distance conventionally used for the formation of a zirconia-containing layer, to 50 mm; or by using the spray coating distance equivalent to the conventionally used distance, and elevating the spray gun current from 600 A to 700 A. The pitch of the vertical cracks observed by sectional microstructure observation was 0.2 mm.

Examples 13 and 14

The same steps as in Examples 3 and 4 were carried out up to the formation of the bond coat layer. Thereafter, an $Sm_2Zr_2O_7$ layer or a $Gd_2Zr_2O_7$ layer of a thickness of 0.5 mm having a columnar structure was formed using an electron-beam vapor deposition method. The electron-beam physical vapor deposition method was performed with an electron-beam vapor deposition apparatus manufactured by Ardennes (e.g., TUBA150), using a sintered ingot of $Sm_2Zr_2O_7$ (synthesized by a powder mixing method using $Sm_2O_3$ in fine powder 3C Series manufactured by Nippon Yttrium Co., Ltd., and $ZrO_2$ in fine powder TZ-0 manufactured by Nippon Yttrium Co., Ltd.) or $Gd_2Zr_2O_7$ (synthesized by a powder mixing method using $Gd_2O_3$ in fine powder 3C Series manufactured by Nippon Yttrium Co., Ltd., and $ZrO_2$ in fine powder TZ-0 manufactured by Nippon Yttrium Co., Ltd.) as a target material, under the conditions of an electron-beam output of 50 kW, an reduced pressure environment of $10^{-4}$ torr, and a temperature of the heat-resistant substrate of 1,000° C. The columnar crystal had a diameter of 50 μm or less.

Comparative Example 4

The same steps as in Examples 3 and 4 were carried out up to the formation of the bond coat layer. Thereafter, a YSZ layer of a thickness of 0.5 mm having a columnar structure was formed in an electron-beam vapor deposition method. The electron-beam physical vapor deposition method was performed with an electron-beam vapor deposition apparatus manufactured by Ardennes (e.g., TUBA150), using an ingot of YSZ powder (204NS-G manufactured by Sulzer Metco (Japan) Ltd. having a compounding ratio of 8% by weight of yttria and 92% by weight of zirconia) sintered under a normal pressure at 1600° C. for 5 hours, under the conditions of an electron-beam output of 50 kW, an reduced pressure environment of $10^{-4}$ torr, and a temperature of the heat-resistant substrate of 1,000° C. The columnar crystal had a diameter of 50 μm or less.

<Measurement of Thermal Conductivity>

The thermal conductivity of each sample prepared above was measured. The thermal conductivity was measured by a laser flash method specified in JIS R1611.

<Evaluation of Thermal Cycle Durability>

Figure 11:
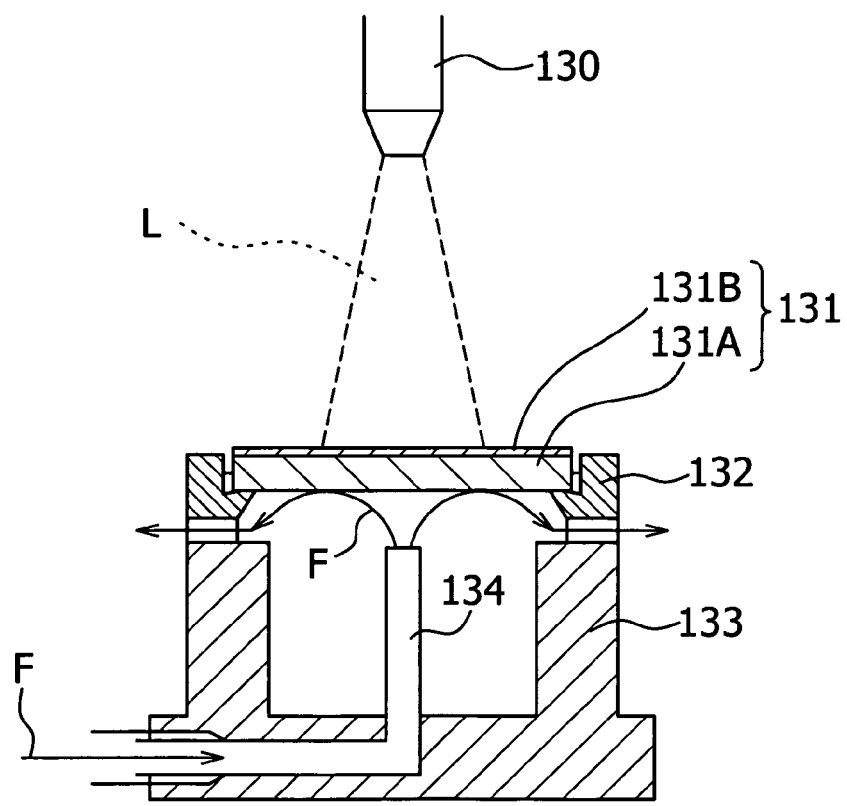
FIG. 11 is a sectional view of a laser-type thermal cycle tester used in the examples of the present invention.

The evaluation of thermal cycle durability was conducted for each sample prepared above. FIG. 11 is a sectional view showing a frame format of a laser-type thermal cycle tester used for the evaluation of thermal cycle durability in this example. In the laser-type thermal cycle tester shown in FIG. 11, the sample 131 wherein a thermal barrier coating film 131B is formed on a heat-resistant substrate 131A is held in the sample holder 132 installed on the main body 133 so that the thermal barrier coating film 131B faces outside. Laser beams L are radiated from a carbon dioxide gas laser 130 onto the sample 131 to heat the sample 131 from the side of the thermal barrier coating film 131B. At the same time of heating by the laser 130, the sample 131 is cooled from the bottom side thereof by the gas flow F discharged from the end of a cooling gas nozzle 134 passing through the main body 133 and being installed on the location facing the bottom side of the sample 131 in the main body 133.

Figure 12A:
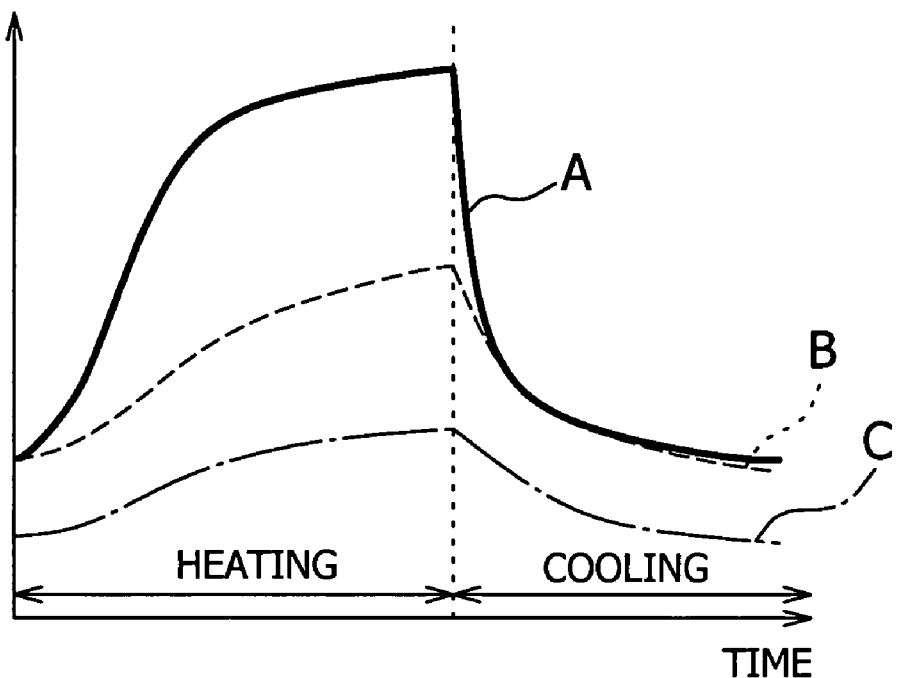
FIG. 12($a$) is a graph showing the temperature history of the sample in the thermal cycle tests using the laser-type thermal cycle tester shown in FIG. 11, and FIG. 12($b$) is an explanatory diagram showing measuring points on the sample corresponding to each curve of FIG. 12($a$).
Figure 12B:
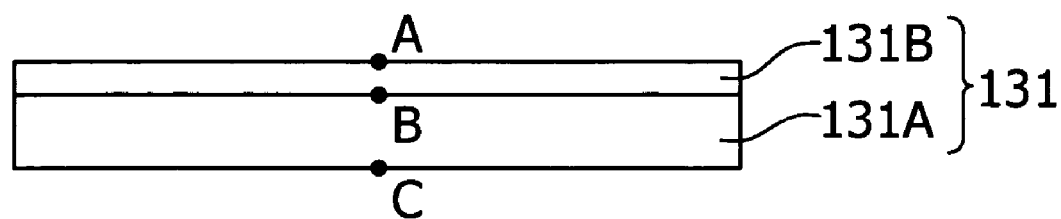

According to the laser-type thermal cycle tester, temperature gradient can be easily formed in the sample 131. Thus, evaluation corresponding to the operating environment in which it is used as a high-temperature part such as a gas-turbine member can be conducted. FIG. 12(a) is a graph showing a scheme of temperature change of the sample subjected to the thermal cycle test using the apparatus shown in FIG. 10. The curves A to C shown in the graph corresponds to temperature measuring points A to in the sample 131 shown in FIG. 12(b). As shown in FIG. 12, according to the apparatus shown in FIG. 11, the sample 131 can be heated so that the temperature is lowered in sequence of the surface (A) of the thermal barrier coating film 131B of the sample 131, the boundary (B) between the thermal barrier coating film 131B and the heat-resistant substrate 131A, and the bottom side (C) of the heat-resistant substrate 131A.

Therefore, for example, by making the temperature of the surface of the thermal barrier coating film 131B as high as 1200° C. or above, and making the temperature of the boundary between the thermal barrier coating film 131B and the heat-resistant substrate 131A 800 to 1000° C., temperature conditions similar to the temperature conditions of actual gas turbines can be obtained. By controlling the output of the laser 130 and the gal flow F, the desirable heating temperatures and temperature gradients by the tester can be easily obtained.

In these examples, using the laser-type thermal cycle tester shown in FIG. 11, repeated heating was performed between a maximum surface temperature (the maximum temperature of the surface of the thermal barrier coating film) of 1500° C. and a maximum boundary temperature (the maximum temperature of the boundary between the thermal barrier coating film and the heat-resistant substrate) of 1000° C. At that time, 3 minutes of heating time and 3 minutes of cooling time were repeated (the surface temperature in cooling was set to be 100° C. or below). In the thermal cycle test, the number of cycles at the time when the separation of the thermal barrier coating film occurred was recorded as the thermal cycle life, which is shown in Table 1.

As shown in Table 1, it is evident that a member coated with thermal barrier of the present invention has excellent thermal cycle durability and low thermal conductivity.

TABLE 1

| | | thermal barrier coating material or member coated with thermal barrier | | evaluation results | |
|---|---|---|---|---|---|
| | corre. embod. | bond coat layer (thick. 0.1 mm) | top coat (comprising zirconia-containing layer and ceramic layer) (thickness 0.5 mm) | thermal conductivity at 800° C. (W/mK) | thermal cycle durability at temp. diff. of 500° C. in top coat (cycles) |
| Ex. 1 | first | none | sintered body of $Sm_2Zr_2O_7$ | 1.02 | — |
| Ex. 2 | first | none | sintered body of $Gd_2Zr_2O_7$ | 1.2 | — |
| Comp. Ex. 1 | — | none | sintered body of YSZ | 2.11 | — |
| Ex. 3 | second | CoNiCrAlY | $Sm_2Zr_2O_7$ film (porous) | 0.3-0.75 | 10-100 |
| Ex. 4 | second | CoNiCrAlY | $Gd_2Zr_2O_7$ film (porous) | 0.6-1.1 | 10-100 |
| Ex. 5 | third | CoNiCrAlY | YSZ film (porous) $Sm_2Zr_2O_7$ film (porous) *1 | 0.52-1.07 | 20-150 |
| Ex. 6 | third | CoNiCrAlY | YSZ film (porous) $Gd_2Zr_2O_7$ film (porous) *1 | 0.67-1.25 | 20-150 |
| Comp. Ex. 2 | — | CoNiCrAlY | YSZ film (porous) | 0.74-1.4 | 10-100 |
| Ex. 7 | fourth | CoNiCrAlY | YSZ film (vert. cracks) $Sm_2Zr_2O_7$ film (porous) *1 | 1.0-1.39 | 30-200 |
| Ex. 8 | fourth | CoNiCrAlY | YSZ film (vert. cracks) $Gd_2Zr_2O_7$ film (porous) *1 | 1.2-1.55 | 30-200 |
| Ex. 9 | fifth | CoNiCrAlY | $Sm_2Zr_2O_7$ film (vertical cracks) | 0.8-0.98 | 50-200 |
| Ex. 10 | fifth | CoNiCrAlY | $Gd_2Zr_2O_7$ film (vertical cracks) | 1.0-1.15 | 50-200 |
| Ex. 11 | sixth | CoNiCrAlY | YSZ film (ver. cracks) $Sm_2Zr_2O_7$ film (ver. cracks) *1 | 1.3-1.5 | 80-300 |
| Ex. 12 | sixth | CoNiCrAlY | YSZ film (ver. cracks) $Gd_2Zr_2O_7$ film (ver. cracks) *1 | 1.5-1.59 | 80-300 |

TABLE 1-continued

| | | thermal barrier coating material or member coated with thermal barrier | | evaluation results | |
|---|---|---|---|---|---|
| | corre. embod. | bond coat layer (thick. 0.1 mm) | top coat (comprising zirconia-containing layer and ceramic layer) (thickness 0.5 mm) | thermal conductivity at 800° C. (W/mK) | thermal cycle durability at temp. diff. of 500° C. in top coat (cycles) |
| Comp. Ex. 3 | — | CoNiCrAlY | YSZ film (vertical cracks) | 1.78-2.02 | 100-500 |
| Ex. 13 | seventh | CaNiCrAlY | $Sm_2Zr_2O_7$ film produced by EB-PVD (columnar crystal) | 0.8-0.92 | 200-600 |
| Ex. 14 | seventh | CaNiCrAlY | $Gd_2Zr_2O_7$ film produced by EB-PVD (columnar crystal) | 0.94-1.1 | 200-600 |
| Comp. Ex. 4 | — | CoNiCrAlY | YSZ film produced by EB-PVD (columnar crystal) | 1.65-1.9 | 200-600 |

*1 the outer film in the top coat.

The invention claimed is:

1. A member coated with thermal barrier comprising:
   a heat-resistant substrate,
   a bond coat layer formed on the heat-resistant substrate, and
   a ceramic layer formed on the bond coat layer, wherein the ceramic layer contains a ceramic represented by a general formula $A_2Zr_2O_7$, wherein A represents a rare earth element, and the ceramic layer has a spray coated structure with vertical cracks in a thickness direction at pitches of 5 to 100% the total thickness of the layer or layers other than the bond coat layer on the heat-resistant substrate.

2. The member coated with thermal barrier according to claim 1, wherein said A is selected from a group consisting of La, Nd, Sm, Gd, Dy, Er, Yb and Lu.

3. The member coated with thermal barrier according to claim 1, wherein said A is Sm.

4. The member coated with thermal barrier according to claim 1, further comprising a zirconia-containing layer having a porosity of 1 to 30% between said bond coat layer and said ceramic layer.

5. The member coated with thermal barrier according to claim 1, further comprising a zirconia-containing layer between said bond coat layer and said ceramic layer, wherein the zirconia-containing layer has vertical cracks in a thickness direction in pitches of 5 to 100% the total thickness of layers other than said bond coat layer on said heat-resistant substrate.

6. A gas turbine comprising said member coated with thermal barrier according to claim 1.

* * * * *